United States Patent [19]

Biedermann

[11] 4,339,208

[45] Jul. 13, 1982

[54] OPTICAL SENSING OF WIRE MATRIX PRINTERS

[75] Inventor: Horst H. Biedermann, Augsburg, Fed. Rep. of Germany

[73] Assignee: NCR Corporation, Dayton, Ohio

[21] Appl. No.: 190,772

[22] Filed: Sep. 25, 1980

[51] Int. Cl.³ .................................................. B41J 3/10
[52] U.S. Cl. ....................................... 400/124; 400/74; 400/711
[58] Field of Search .................... 400/74, 83, 121, 124, 400/711; 235/473; 250/277 R

[56] References Cited

U.S. PATENT DOCUMENTS 3,714,447 1/1973 Jallais .............................. 250/227 R

FOREIGN PATENT DOCUMENTS 2320962 3/1977 Fed. Rep. of Germany ........ 400/74
2617902 11/1972 Fed. Rep. of Germany ...... 400/124

OTHER PUBLICATIONS

*IBM Tech. Disc. Bulletin,* Dattilo et al., vol. 20, No. 4, Sep., 1977, p. 1299, 400-83.
*IBM Tech. Disc. Bulletin,* Poe, vol. 12, No. 7, Dec., 1969, p. 957, 400-74.
*IBM Tech. Disc. Bulletin,* Sokolski, vol. 8, No. 6, Nov., 1965, pp. 879-880, 235-473.

*Primary Examiner*—Paul T. Sewell
*Attorney, Agent, or Firm*—J. T. Cavender; Wilbert Hawk, Jr.; George J. Muckenthaler

[57] ABSTRACT

An optical sensor is provided for each print wire of a print head and includes two glass fibers to carry light from a light-emitting diode to the surface of a record medium and to carry the reflected light to a photodiode. Each printed dot is detected and the sensor output is compared with a delayed or stored print signal which is applied to the drivers for the print wires.

4 Claims, 2 Drawing Figures

OPTICAL SENSING OF WIRE MATRIX PRINTERS

BACKGROUND OF THE INVENTION

In the field of impact printing, one of the most common types of printers has been the wire printer for printing characters in a dot matrix manner. As is well-known, the impact operation depends upon the movement of the wires which are typically moved by means of an electromechanical system which is believed to enable a precise control of the impact members.

One manner of wire matrix printing utilizes a single wire carried in side-to-side motion and driven into impact with paper or like record media upon energization of an electromagnetic solenoid. Another manner of wire matrix printing utilizes a print head having a plurality of wires disposed in alignment for printing characters as the print head is moved in side-to-side motion and as the wires are driven into impact with the paper upon energization of associated electromagnetic solenoids.

It is desired to increase the print quality of wire matrix printers and accordingly to eliminate or at least to substantially reduce certain problems in these printers. These problems or trouble areas can include determining whether the ink ribbon provides sufficient ink during the printing operation, whether the actual dot positions correspond with the desired positions and whether the print wires are operating in proper manner during the course of printing.

It is therefore proposed to observe the printing operation by way of sensing and supervising the dot imprints on the paper.

Representative prior art in the field of sensing printed indicia includes German Pat. Specification No. 2,320,962, granted to A. S. Baran et al. on Mar. 17, 1977, which discloses a printing device with an optical sensing head on the printer carriage and which reads the bars on a special program sheet.

German Specification No. 2,617,902, to J. Gross and opened to the public on Nov. 3, 1977, discloses an error indicating device for a wire printer which includes force sensing means in the plane of the platen in face-to-face relationship with the print head and responsive to impact of the print wires and providing signals for interrupting the printing operation. The force sensors which are located at extreme left and right positions in the platen determine whether all the print wires strike with the proper force.

German Specification No. 2,816,542 to T. Ota, opened to the public on Oct. 26, 1978 and corresponding to U.S. Pat. No. 4,184,781, discloses force sensing elements in the platen of a dot printer wherein the drive mechanism drives each dot printing element when the printing elements come to rest on the opposite side of the sensing elements and force errors of each printing element are determined by decreases in the force sensing output signals generated by the drive of the printing elements. The force sensor in the platen is divided into a plurality of individual force sensing elements associated with each print wire to enable energization of all print wires simultaneously during each test operation.

A bar code reader or visual record printer designated as Class 4504 and made by NCR Corporation has a combined ball print head and a read head or optical sensing element consisting of two glass fibers which are sufficiently broad for detecting a printed bar made up of a plurality of dots. The detection of the printed bar takes place during an individual reading run of the carriage along the line of the printed bars.

U.S. Pat. No. 3,476,311, issued to A. P. Feldman on Nov. 4, 1969, discloses a two-dimensional structure encoding typewriter including horizontal and vertical position sensing apparatus which is responsive to the typing of a symbol for providing output signals indicative of the coordinates of each typed symbol to encoding apparatus which converts the signals into a suitable code for recording.

SUMMARY OF THE INVENTION

The present invention relates to wire matrix printing, and more particularly to a supervisory system for observing or sensing the formation of dots in the printing of characters on paper or like record media. It is not common by reason of the use of an ink ribbon and the high speed of the wires in a matrix printer that the above-mentioned problems or trouble areas can and do exist in wire matrix printing operations. It is therefore believed that the subject matter of the present invention will eliminate or at least minimize these problems in dot matrix printing.

An optical sensing element is operably associated with each print wire in a manner wherein each dot printed by a print wire on the paper is detected or sensed at a predetermined time period after the printing action. The output signal of each sensing element is compared with the respective print signal which may be stored or time-delayed by the time period. An error signal is effected in the control system if the comparison produces a negative result.

In a preferred embodiment of the invention, a multi-wired print head has a multi-row of optical sensing elements arranged in parallel and as close as possible to the row of print wires in the print head and carried on the same carriage as the print head. Each sensing element may consist of at least two glass fibers, one for guiding the light from a light source to the paper or record medium and the other for guiding the reflected light to a photodiode. In a different arrangement, each sensing element may consist of four glass fibers for achieving a higher resolution.

In view of the above discussion, the principal object of the present invention is to provide a system for supervising the actual printing of dots or marks on record media and compare the printing with a desired format of dots or marks.

Another object of the present invention is to provide means for sensing the actual dots or marks on the record media in printing operations and detecting whether certain printing conditions are correct.

An additional object of the present invention is to provide sensing means for detecting printing errors and for indicating when such errors are made.

A further object of the present invention is to provide a printing system wherein print wires are caused to be advanced or driven into contact with the record media and against the ink ribbon and the platen for printing in dot matrix manner and means is provided for immediately supervising the dots or marks and determining if the dots of the printed characters are correctly printed.

Additional advantages and features of the present invention will become apparent and fully understood from a reading of the following description taken together with the annexed drawing.

DETAILED DESCRIPTION OF THE INVENTION

Figure 1:
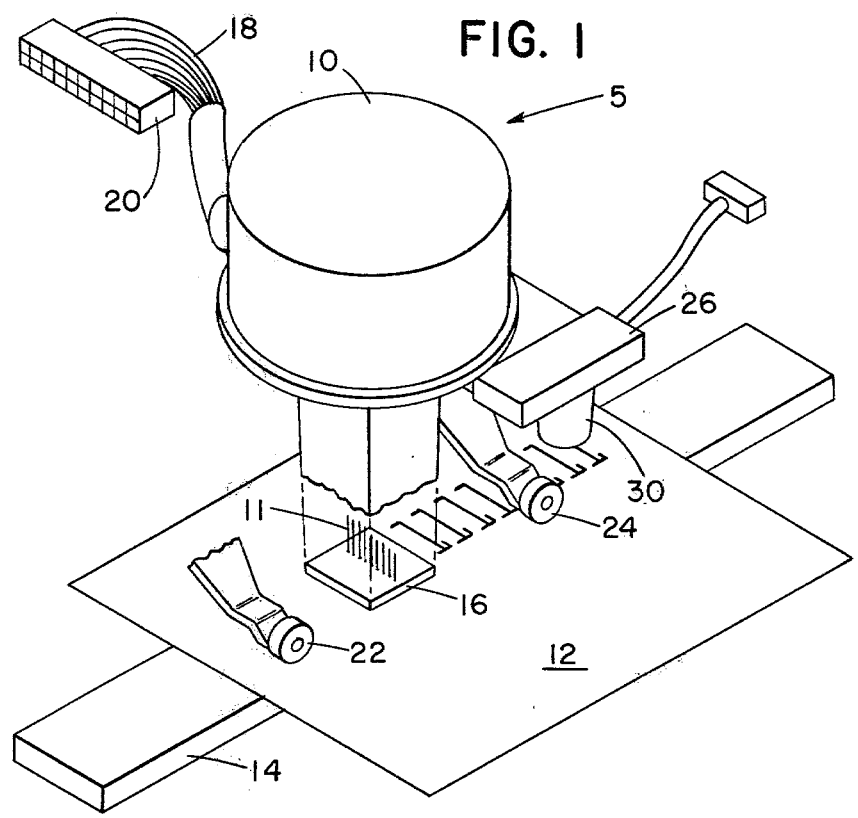
FIG. 1 is a diagrammatic view of a print head with an associated sensing element.

FIG. 1 shows a wire matrix print head 5 with wire drive elements or solenoids (not shown but formed in a circular arrangement within a housing 10) for driving print wires 11 to effect printing in dot matrix manner on paper 12 or like record media. The paper 12 is caused to be transported or driven in a path between a platen 14 and the nose portion 16 of the print head 10. Wires or leads 18 are connected to a terminal block 20 and to the individual solenoids for driving the wires 11 for effecting printing upon pulsing of the solenoids.

A pair of pressure rollers 22 and 24 are provided on the sides of the nose portion 16 to maintain the paper 12 in precise position on the platen 14 during side to side movement of the print head 5 in printing operation.

A read head 26 is supported from the print head 5 and moves therewith to immediately sense the printing of the dots which make up the various characters. In FIG. 1 the print head is seen to be moving from right to left across the platen 14 and is printing the numeral "1" in repeated manner and the read head 26 is detecting the printed numerals immediately after printing thereof.

Figure 2:
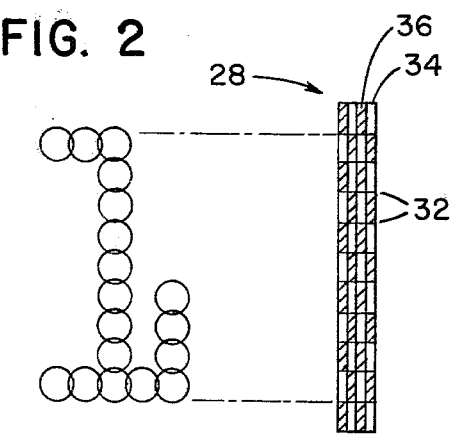
FIG. 2 is a view of a dot matrix character with the optical fibers associated with each dot thereof.

FIG. 2 shows a composite view of a numeral "1" in dot matrix form along with an array 28 of optical sensing elements which are contained in a nose portion 30 of the read head 26. The array 28 is in the form of a window of the read head 26 wherein light passes to and from the paper 12. Each of the printed characters is defined within a 9×5 matrix pattern wherein the nine wires 11 are in alignment at the face of the nose portion 16 of the print head 5 and are individually actuated by respective solenoids for the printing operation.

The optical sensing element array 28 consists of an 11×4 arrangement for covering the nine dot high character and for an additional sensing element above and below the normal print area. A light-emitting fiber 34 and a light-receiving fiber 36 are repeated in the direction of travel of the print head to make up a sensing element or device 32 for each dot or each row of dots and comprises four glass fibers in adjacent manner. While one light-emitting fiber 34 for guiding light from a light source, such as a light-emitting diode, and one light-receiving fiber 36 for guiding reflected light from the paper 12 to a photodiode are sufficient for sensing or detecting a dot, the two additional glass fibers 34 and 36 enable the achieving of a higher resolution of supervision of the print quality.

The optical sensing element 32 consisting of the four fibers is associated with each print wire 11 in a manner that each dot printed by a print wire on the paper 12 is detected individually by the associated sensing element at a predetermined time period after the printing operation. The time period depends on the distance between the end of the print wire 11 and the associated sensing element 32 and also on the speed of the relative movement between the carrier for the print head 5 and the respective sensing elements 32 and the paper 12. The output signal of each sensing element 32 is compared with the respective print signal which may be stored or may be delayed by the certain time period, all in a manner well known in the art. An error signal may also be produced in the control system in well known manner to provide operator or machine readable indication in those cases where the comparison of these output signals provides a negative result.

While a nine dot high column is shown in FIG. 2, the invention is also applicable for the well known 7×5 matrix character pattern. The additional sensing elements above and below the numeral "1" are provided for reading documents having characters which are not in precise alignment.

It is thus seen that herein shown and described is apparatus for continuously supervising the printing of characters and the quality of the printed characters immediately after the printing operation. The sensing or detecting scheme includes the concept of whether the inking medium is providing sufficient ink for printing the dots, whether the actual dot positions correspond with the desired positions and whether the print wires are operating in proper manner. The apparatus of the present invention enables the accomplishment of the objects and advantages mentioned above and, while a preferred embodiment of the invention has been disclosed herein, variations may occur to those skilled in the art. It is contemplated that all variations and modification not departing from the spirit and scope of the invention hereof are to be construed in accordance with the following claims.

I claim:

1. Apparatus for supervising the printing of dot matrix characters on record media in a printer having a print head including at least one dot producing element movable along a line of printing, said apparatus comprising: a read head carried by said print head for sequentially reading the printing of each dot of said characters, said read head including light emitting means and light receiving means, and fiber optic guide means carried by said read head and associated with each dot producing element for guiding light from said light emitting means to said record media and for guiding reflected light to said light receiving means for sensing each of the dots immediately upon being produced by said element.

2. The apparatus of claim 1 wherein the print head includes a plurality of print wires aligned at one end thereof for printing dots and said guide means includes a plurality of repeated sensing elements and aligned with said wires.

3. In a dot matrix printer having a print head including a plurality of aligned print wires movable along a line for printing on record media and a platen positioned opposite said print head to carry the record media therebetween, means for supervising the printing of dot matrix characters comprising: a read head supported from said print head and carried thereby for sequentially reading the printing of each dot making up said characters and including light emitting means and light receiving means, and fiber optic means carried by said read head and associated with each wire of said print head for guiding light from said light emitting means to said record media and for guiding reflected light to said light receiving means for sensing each of the dots immediately upon being printed by the wires of said print head.

4. In the printer of claim 3 wherein said guiding means includes a plurality of repeated sensing elements aligned perpendicular to said aligned print wires.

* * * * *